United States Patent
Guvendiren et al.

(10) Patent No.: US 12,186,986 B2
(45) Date of Patent: Jan. 7, 2025

(54) METHOD FOR 3D PRINTING A THERMALLY CURABLE POLYMERIC INK

(71) Applicant: New Jersey Institute of Technology, Newark, NJ (US)

(72) Inventors: Murat Guvendiren, Metuchen, NJ (US); Chya-Yan Liaw, East Rutherford, NJ (US); Andrew House, Teaneck, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 164 days.

(21) Appl. No.: 17/898,746

(22) Filed: Aug. 30, 2022

(65) Prior Publication Data

US 2023/0136182 A1 May 4, 2023

Related U.S. Application Data

(60) Provisional application No. 63/238,844, filed on Aug. 31, 2021.

(51) Int. Cl.
| | |
|---|---|
| *B29C 64/295* | (2017.01) |
| *B29C 64/118* | (2017.01) |
| *B29C 64/209* | (2017.01) |
| *B29C 64/245* | (2017.01) |
| *B29C 64/393* | (2017.01) |
| *B33Y 10/00* | (2015.01) |
| *B33Y 30/00* | (2015.01) |

(Continued)

(52) U.S. Cl.
CPC .......... *B29C 64/295* (2017.08); *B29C 64/118* (2017.08); *B29C 64/209* (2017.08); *B29C 64/245* (2017.08); *B29C 64/393* (2017.08); *B33Y 10/00* (2014.12); *B33Y 30/00* (2014.12); *B33Y 50/02* (2014.12); *B29K 2101/10* (2013.01); *B29K 2995/006* (2013.01)

(58) Field of Classification Search
CPC ... B29C 64/295; B29C 64/118; B29C 64/245; B33Y 30/00
See application file for complete search history.

(56) References Cited

U.S. PATENT DOCUMENTS

| | | | |
|---|---|---|---|
| 2006/0054039 A1* | 3/2006 | Kritchman | B29C 48/92 427/256 |
| 2016/0346997 A1* | 12/2016 | Lewis | B29C 70/06 |

(Continued)

FOREIGN PATENT DOCUMENTS

| | | |
|---|---|---|
| KR | 101827360 B1 * | 2/2018 |
| WO | 2014126834 A2 | 8/2014 |

(Continued)

OTHER PUBLICATIONS

KR101827360B1—Machine Translation (Year: 2018).*

(Continued)

*Primary Examiner* — Yunju Kim
(74) *Attorney, Agent, or Firm* — Lerner David LLP

(57) ABSTRACT

A method is disclosed for 3D printing thermally curable polymeric inks and their composites for scaffolds or devices. In this method, an extrusion based direct ink writing printing technology was used. The method includes an in-situ curing process and print layer height adjustment steps after each print layer to compensate for shrinkage during a thermal treatment step.

21 Claims, 4 Drawing Sheets

(51) Int. Cl.
  *B33Y 50/02*  (2015.01)
  *B29K 101/10*  (2006.01)

(56) References Cited

U.S. PATENT DOCUMENTS

| | | | |
|---|---|---|---|
| 2017/0199408 A1* | 7/2017 | Zhang | G02F 1/13378 |
| 2020/0147863 A1* | 5/2020 | Coulter | B33Y 70/00 |
| 2021/0394443 A1* | 12/2021 | Ferris Roig | B29C 64/259 |
| 2022/0168951 A1* | 6/2022 | Chen | B29C 64/295 |

FOREIGN PATENT DOCUMENTS

| | | |
|---|---|---|
| WO | 2014126837 A2 | 8/2014 |
| WO | 2014126834 A3 | 11/2014 |

OTHER PUBLICATIONS

Wang, Biran, et al., "3D printing of in-situ curing thermally insulated thermosets", Manufacturing Letters, vol. 21, Jun. 2019, pp. 1-6, ISSN 2213-8463, https://doi.org/10.1016/j.mfglet.2019.06.001.
TechConnect, "Thermally Cured Thermoset Polymer Materials for Additive Manufacturing", (Nov. 2018). Retrieved from the Internet on Nov. 28, 2022: <https://techconnect.org/news/entry.html?id=640>. 2 pgs.

* cited by examiner

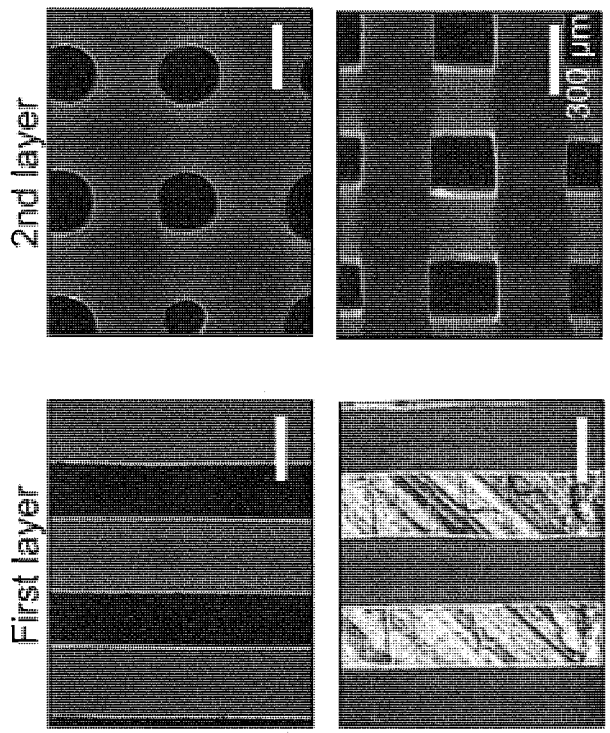
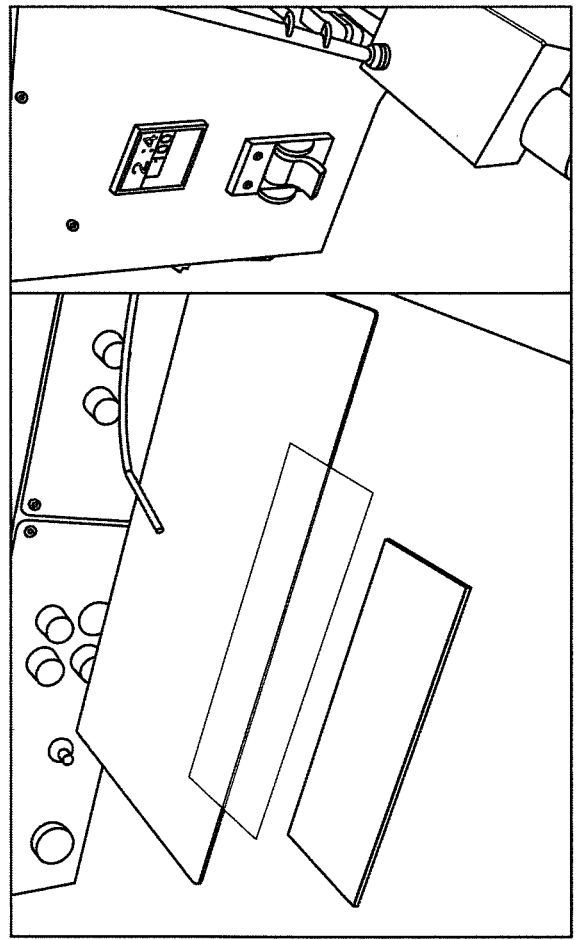
Figure 3A
Figure 3B

METHOD FOR 3D PRINTING A THERMALLY CURABLE POLYMERIC INK

CROSS-REFERENCE TO RELATED APPLICATION

The present application claims the benefit of the filing date of U.S. Provisional Patent Application No. 63/238,844, filed Aug. 31, 2021, the disclosures of which are hereby incorporated herein by reference.

FIELD OF THE DISCLOSURE

The present disclosure relates to 3D printing. In particular, the present disclosure relates to a 3D printing method for thermally curable polymeric inks and their composites.

BACKGROUND

Additive manufacturing (AM) or printing technologies create physical objects from three-dimensional (3D) data, typically by providing, curing, or fusing material in a layer-by-layer manner. Additive manufacturing technologies include but are not limited to extrusion based 3D printing, stereolithography, laser sintering, multi-jet modeling, binder-on-powder 3D printing, laminated object manufacturing, and other technologies. Many of these technologies are often used to make objects (parts) from only a single material or from a few materials to provide single-functional parts, which may limit the usefulness of such parts. The process of 3D printing has become increasingly popular over recent years. Again, 3D printing refers generally to processes used to manufacture a three-dimensional object in which successive layers of material are formed under computer control to create a 3D construct or a device.

Among the various AM techniques, direct ink writing (DIW) has emerged as the most versatile 3D printing technique for the broadest range of materials. DIW also called Direct Write Fabrication. Robocasting, or Robot-Assisted Shape Deposition is a method associated with the material extrusion. DIW allows printing of any material, as long as the precursor ink can be engineered to demonstrate appropriate rheological behavior. This technique acts as a unique pathway to introduce design freedom, multifunctionality, and stability simultaneously into its printed structures.

However, DIW presents various challenges and limitations of this technique. It is exceedingly difficult to 3D print thermally curable polymeric inks and their composites as decreasing the solvent content makes the ink too viscous for printing. In the case of maintaining the solvent, this technique leads to sagging during printing. Some challenges faced by thermoset printing include poor shape fidelity, the time required to cure, and shape shrinkage. In addition, there are several rheological issues with utilizing various inks with different chemistry because again of viscous flow the printing process may not be complete, and the printing nozzles may become clogged.

Current technologies have tried to resolve some of these challenges by changing the ink chemistry or amount of solvent in each particle material used to print. This technique, however, is not only costly because each material needs to be formulated for a particular purpose, but it is also unreliable for use with a broad range of materials. In addition, changing the chemistry of each may lead to various processing issues including longer cure times, variable material shrinkage, clogged printing nozzle, and the need to change various components on the 3D printer to handle the various ink formulations.

Thus, there remains a need in the art for a DIW 3D printing process that may be utilized regardless of the printing ink material used. There is also a need in the art for a DIW printing process that may be utilized with either a thermoplastic material or a thermoset materials as the printing medium.

SUMMARY

In accordance with embodiments of the present disclosure, a process for 3D printing a thermally curable polymeric ink is disclosed. In one embodiment, a process for making a 3D scaffold or a device is disclosed. The process could include the steps of printing a layer of a thermally curable polymeric ink on a heated support or by blowing heated air to create a heated substrate, printing a second layer of the ink, and setting a pause time between each subsequent layer of the ink. The process could also include the step of adjusting the height of at least one of the subsequent layers of the printed ink.

In one embodiment, the process could include the following steps: (1) feed thermoset solution inks (2 mL) into a direct ink writing (DIW) 3D printer; (2) place a silicone rubber heating pad or heated print surface with thermocouple temperature sensors connected to a temperature controller; and the heating pad provides a heating print surface.

Depending on the embodiment any heating mechanism that provides a heated print surface may be used. Examples include, but are not limited to, a heated print surface, irradiated print surface, convention heated print surface, conduction heated print surface, evaporative cooling/heated print surface, and the like, which provides a heated print surface may be utilized.

Advantages of using one of these heating methods over another heating method are further described herein. (3) adjust the temperature control toward the desired temperature $T_{plate}$; (4) allow the heating pad or heated print surface to warm up and equilibrate at $T_{plate}$ for at least 1 hour; (5) print the inks on a glass slide as lines at a specific spacing and at a set pressure and speed to create cross-hatched orthogonal scaffolds; (6) after each layer is printed, the print is paused for a period of time, $t_{pause}$, to allow solidification induced by crosslinking and solvent evaporation; (7) resume printing the subsequent layer; (8) apply adjustments to the layer height for each layer by p % to compensate for the shrinkage of the printed layer due to solvent evaporation and crosslinking; and (9) repeat steps 5-8 until the desired thickness of the scaffolds is achieved; and (10) further cure the printed object in a closed oven chamber for at least $t_{post-cure}$ to achieve a fully-crosslinked and solvent-free construct.

In one embodiment, a method for making a 3D scaffold or a device could include the steps of (1) feeding a thermoset solution ink or other 3D ink into a direct ink writing 3D printer; (2) providing a heating pad or heated print surface or a source of heat; (3) adjusting the temperature control toward a desired temperature; (4) allowing the heating pad or heated print surface or the source of heat to equilibrate at the desired temperature for at least 1 hour; (5) printing the ink on a slide as lines at a specific spacing and at a set pressure and speed to create a cross-hatched orthogonal scaffold; (6) after each layer is printed, pausing the print for a period of time to allow solidification induced by crosslinking and solvent evaporation; (7) resume printing a subsequent layer; (8) applying adjustments to the layer height for each layer; (9) repeating steps 5 to 8 until the desired thickness of the scaffold or the device is achieved; and (10) further curing the printed object in a closed oven chamber to achieve a fully-crosslinked and solvent-free construct.

In one embodiment, the exact parameters for curing and print layer adjustment were determined for each ink formulation based on post-characterization including rheology, differential scanning calorimetry (DSC), and standard line test. These parameters can then be used to modify the g-code developed by the printer after slicing to automate the process. Alternatively, these parameters can be implemented by hand during printing.

Any combination and/or permutation of the embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

For a more complete understanding of the present invention, reference is made to the following Detailed Description, considered in conjunction with the accompanying drawings, in which:

FIG. 3A is a photograph showing an experimental setup for the printing process, which includes a heating pad or heated print surface with the thermocouple temperature sensor connected to a temperature controller taped on the printing substrate to facilitate the solvent evaporation and the curing reaction;

FIG. 3B shows the effect of incorporating a heated substrate;

DETAILED DESCRIPTION

Disclosed is a process to 3D print thermally curable polymeric ink solutions with or without additives that avoids the problems of the prior art and provides many additional improvements. Shown and described is an improvement for direct ink writing (DIW) process of polymer solution based inks that are thermally curable. The process allows DIW of thermally curable polymeric inks and their composites in high fidelity regardless of the amount of solvent used, or if the material is a thermoset or thermoplastic.

Developed and shown herein is a new process to control the thermal curing and associated shrinkage in-situ during DIW printing process. Prior attempts to control these variables focused on developing new ink formulations or additives to control thermal curing process. The present process is applicable to all thermally curing inks and does not require adjustment of polymer chemistry or incorporation of functional additives.

In one embodiment, a method is disclosed for 3D printing of thermally curable polymeric inks and their composites. The method could utilize extrusion based direct ink writing (DIW) printing using thermally curable polymeric inks. In one embodiment, the ink could be composed of a thermally curable polymer (or a thermoset precursor) dissolved in a low boiling solvent.

A composite ink includes, but is not limited to, a thermally curable polymer (or a thermoset precursor), filler particles, and a solvent with an appropriate boiling point and good miscibility with the thermoset precursor. Examples of thermally curable polymeric inks include, but are not limited to, composites that contain hydroxyapatite. The method could be applied to any thermally curable polymer with or without additives.

For each ink, a successful 3D printing process depends on multiple factors. Such factors include the desired flow and viscoelastic properties of the ink, and a reasonable solidification rate, which relies on both the evaporation of the solvent and the curing activity.

Figure 1:
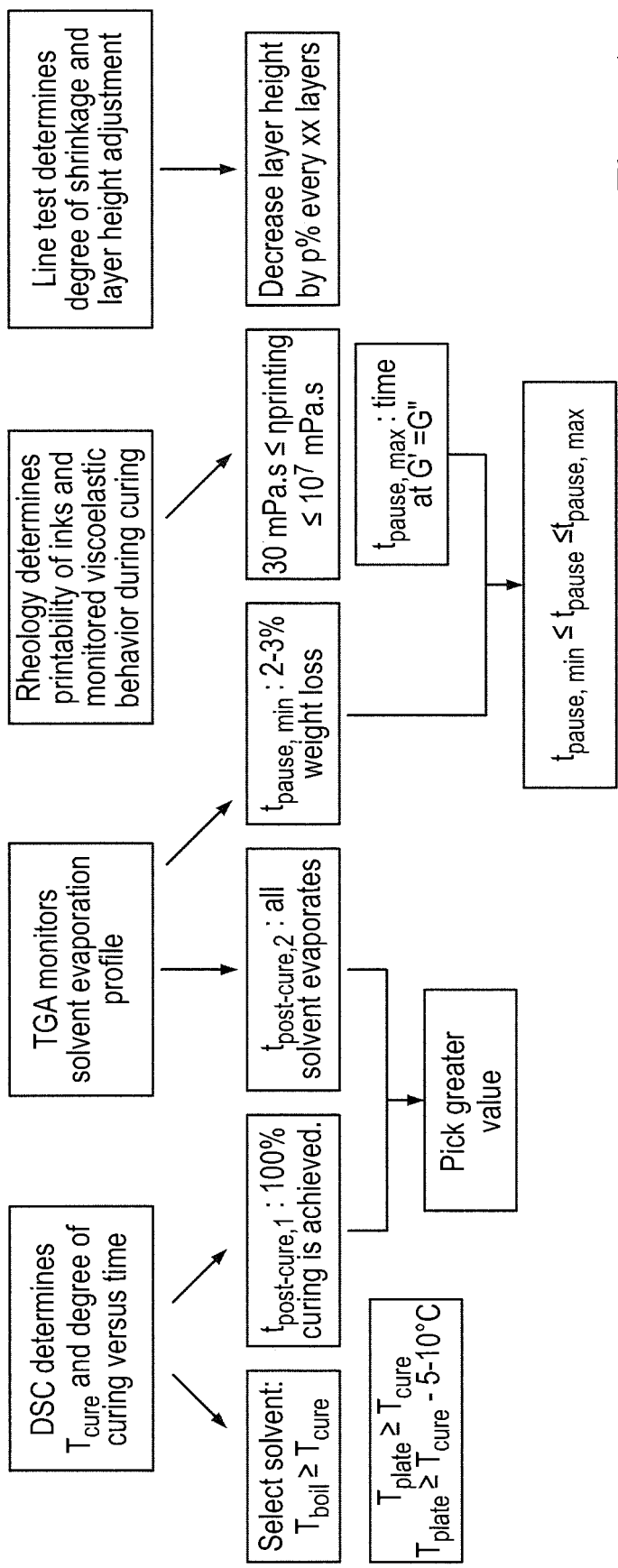
FIG. 1 shows a view outlining an approach to determine parameters to be used in a printing process, in accordance with one embodiment of the present disclosure.

FIG. 1 shows a view outlining one embodiment of an approach to determine parameters to be used in a printing process. In particular, DSC 101 (differential scanning calorimetry) could be used to determine the curing activity, TGA 102 (thermogravimetric analysis) could be used to monitor the solvent evaporation rate, rheology 103 could be used to determine the flow and viscoelastic properties of the inks, and a line test 104 could be used to determine the shrinkage along the Z-axis. The results could be used as the input settings for the printing process. Each approach is described below in detail.

DSC could be used to determine the curing temperature ($T_{cure}$) in one embodiment. The inks were analyzed in crimped vented pans. Thermographs were recorded over the expected curing temperature range, with a scanning rate of 10° C./min. Knowing the curing temperature aids in the selection of the solvent. An appropriate solvent should have a boiling temperature ($T_{boil}$) close to or slightly higher than the curing temperature. If the boiling temperature of the solvent is too low, the printed object will only be allowed to cure at/below the boiling temperature of the solvent in order to prevent bubbling, which can result in low curing reactivity and long curing time. The temperature of the heated build plate ($T_{plate}$) was set to be the same or higher than the curing temperature of the ink, but should be approximately 5-10° C. lower than the boiling temperature of the solvent.

DSC 101 could also be used to determine the degree of curing over time. An appropriate sample was loaded in a crimped vented pan and was heated at a rate of 50° C./min from 25° C. to the set temperature of the heated build plate. Isothermal DSC measurements were conducted for 3 hours. The degree of curing reaction is defined as $\Delta H_t/H_0$, where $\Delta H_t$ is the heat flow integrated up to a specific time and $H_0$ is determined by integrating the exothermic peak of non-isothermal DSC curve with a heating rate of 10° C./min. Based on the degree of curing over time, one can determine the length of the post-curing time $t_{post-cure,\ 1}$, at which 100% curing was achieved.

In one embodiment, TGA 102 could be used to monitor the weight loss due to solvent evaporation during the curing process. The result could be used to determine the minimum pause time $t_{pause,\ min}$ between printed layers. An uncured, as-printed strut with an initial strut size of approximately 450 μm was printed and quickly placed in a pan (load multiple struts if necessary to achieve appropriate weight) and heated in air at a rate of 50° C./min from 25° C. to the set temperature of the heated build plate, and held isothermally until the solvent is completed evaporated.

The evaporation rate of the solvent for different ink formulations can then be determined. A desired initial solvent evaporation rate should be higher than 2%/min so that the strut can retain its shape without undesirable spreading. The time at which a 2-3% weight loss occurred was determined as $t_{pause,\ min}$ between printed layers. The time at which all solvent evaporates is $t_{post-cure,\ 2}$. It will be compared with $t_{post-cure,\ 1}$ and the one with the greater value should be set as the post-curing length, $t_{post-cure}$, of the printed objects.

In one embodiment, rheology 103 could be used to assess the printability of the ink. Steady-state viscosity as a function of shear rate was measured using a parallel plate geometry with a fixed gap and in a shear rate range of 0.1 to 500 s$^{-1}$. The range of shear rate at which the ink is subjected during printing was estimated by $32Q/\pi d^3$, where Q is the volumetric flow rate and d is the nozzle's diameter. The shear viscosity in the range of the estimated shear rate should fall within the range of $30-6\times10^7$ mPa·s to be successfully extruded.

Rheology 103 could also be used to monitor the viscoelastic behavior of the ink during curing. Oscillation measurements were conducted using a rheometer with a parallel-plate fixture. All experiments were conducted in the linear viscoelastic regime. The samples were heated at a rate of 50° C./min from 25° C. to the set temperature of the heated build plate and the shear moduli G' and G" were recorded as a function of time during isothermal curing. The G'/G" crossover is an approximate measure of the material transitioning to solid-like behavior. The pause time should be less than the time at which G' and G" crossover ($t_{pause,\ max}$) to ensure sufficient interlaying bonding.

The deposited strands tend to shrink during curing and solvent evaporation. As more layers are deposited, the shrinkage further worsens, and finally, the strands cannot be deposited onto the previous layer. To solve this issue, the layer height should be carefully adjusted during printing. A line test 104 should be conducted prior to printing. A number of straight lines is printed on a heated build plate with the temperature set at $T_{build}$, and wait for $t_{pause}$.

The lines were broken in half in liquid nitrogen to observe their cross-sections under an optical microscope. The height $H_f$ of the lines was measured from the cross-sectional view image. Assuming the original height of the line equals the nozzle offset $H_0$ (distance between the tip of the nozzle and the print bed), the percentage of shrinkage p % can then be estimated by $(H_0-H_f)/H_0\times100\%$. The layer height along the Z-axis can be adjusted in g-code, such that the layer height is decreased by p % every two layers to ensure good attachment between the layers.

In the case of 3D printers, the G-Code or g-code is the actual file that the 3D printer reads. The G-Code file contains the instructions for the 3D printer to build the object layer by layer (i.e., starting point, the direction and the speed of the nozzle, and various other printer parameters).

Figure 2:
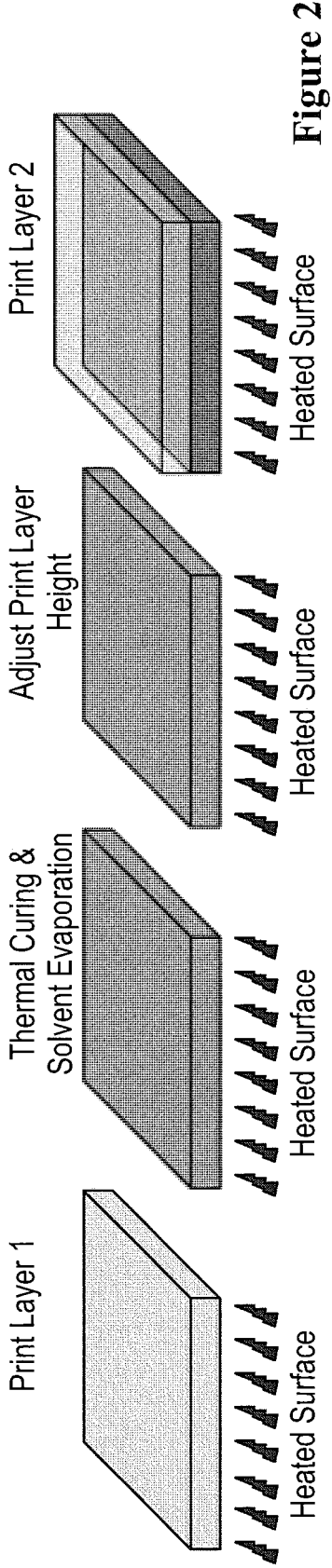
FIG. 2 shows views outlining one embodiment of a printing method.

FIG. 2 illustrates one embodiment of the present process. Printing of layer 1 as shown in step 201 is done on a heated print surface. Utilization of a heated print surface avoids in on aspect the need to adjust solvent in the ink formula.

The heated print surface may be adjusted, depending on the implementation, to accommodate various ink formulations. In step 202, thermal curing occurs and solvent evaporation by using the heated print surface. Unlike prior art systems that utilized light to cure the material, this process utilizes a heated print surface. As previously described the heated print surface may be heated by convection of the heated print surface or on the heated substrate (blowing of air either on the heated surface or on the printed layer itself), conduction of the heated print surface, radiation of the surface, cooling evaporation of the heated print surface, or any combination thereof.

Thermal conduction is the process which heat is transferred from a hotter area to a colder area of an object. A common example of conduction is the process of heating a pan on a stove. The heat from the burner transfers directly to the surface of the pan. Temperature is a measure of the amount of kinetic energy processed by the particles in a sample of matter.

Thermal radiation is electromagnetic radiation generated by the thermal motion of particles in matter. Thermal radiation is generated when heat from the movement of charges in the material (electrons and protons in common forms of matter) is converted to electromagnetic radiation.

Heat or thermal convection is the transfer of thermal energy by the physical movement of fluid (liquid, gas, or plasma) from one location to another. Heat convection is often the primary mode of energy transfer in liquids and gases. Along with conduction and radiation, convection is one of three basic methods of heat transfer.

In another mode of heat transfer, evaporative cooling, otherwise known as adiabatic cooling, works on the principle of water evaporation through which the air is cooled down to a comfortable temperature. It is a cooling and ventilation technique that uses water as its refrigerant. As on area is being cooled, heat is being forced into another area, such as the effect that happens in the back of a refrigerator unit.

In step 203, the print layer height may be adjusted on the heated print surface. Adjustment of the print height also allows flexibility of in the printing process to facilitate curing of the material and reduction of material shrinkage. In step 204, printing of the second layer is achieved, and the process continues as in steps 202, and step 203 until the part is completed.

One embodiment of the printing process is disclosed below. The printing process could start following the steps below once the print settings are developed. In one aspect, the thermal treatment steps incorporated in the printing process and the print layer adjustment (incorporated into a g-code software, for example) is meant to compensate for polymer shrinkage during thermal treatment.

The below processes allow a high fidelity product with minimization of material shrinkage and elevates curing issues that the prior art must contend with when using a variety of materials. In this process for one embodiment, the following steps may be utilized:

(1) feed the thermoset solution inks (2 mL) into a direct ink writing (DIW) 3D printer.
(2) place a silicone rubber heating pad, or heated print surface with the thermocouple temperature sensors connected to a temperature controller. The edges of the heating pad or heated print surface are taped down with a suitable adhesive, such as Kapton® tape, to ensure good contact with the substrate.
(3) adjust the temperature control toward the desired temperature $T_{plate}$.
(4) allow the heating pad or heated print surface to warm up and equilibrate at $T_{plate}$ for at least 1 hour.
(5) the inks are then printed on a glass slide as lines at a specific spacing and at a set pressure and speed to create cross-hatched orthogonal scaffolds.

(6) after each layer is printed, the print is paused for a period of time, $t_{pause}$, to allow solidification induced by crosslinking and solvent evaporation.

(7) resume printing the subsequent layer.

(8) apply adjustments to the layer height for each layer by p % to compensate for the shrinkage of the struts due to solvent evaporation and crosslinking.

(9) repeat steps 5-8, as illustrated in FIG. 2, until the desired thickness of the scaffolds is achieved.

(10) The printed object could be further cured in a closed oven chamber for at least $t_{post-cure}$ to achieve a fully-crosslinked and solvent-free construct.

In another approach the following steps may be utilized to achieve the objects of the present invention:

(1) Feed the thermoset polymer inks (2 ml) into a Direct Ink Writing (DIW) 3D printer.

(2) Place a silicone rubber heating pad with the thermocouple temperature sensors connected to a temperature controller. The edges of the heating pad or heated print surface are taped down with Kapton® tape (polyimide tape) or some other adhesive to ensure good contact with the substrate.

(3) Adjust the temperature control towards the desired temperature. The desired temperature is chosen based on the solvent in the ink. The temperature should be at least around 10° C. below the boiling temperature of the solvent used. A temperature setting that is too high might lead to rapid evaporation of the solvent and bubbles formation, which can result in inferior quality of the print. A temperature setting that is too low can cause slow solvent evaporation and crosslinking rate, which can also lead to poor shape fidelity of the print. Therefore, choosing an optimal temperature is crucial for a successful print.

(4) Allow heating pad or heated print surface to warm up and equilibrate at the set temperatures for at least 1 hour.

(5) The inks are then printed on a glass slide as lines at a certain spacing and at a set pressure and speed to create a cross-hatched orthogonal scaffolds. The dimension of the scaffolds depends on the compositions of the ink. Scaffolds with a square shape are printed with inks which show undamaged shape fidelity (storage moduli G'>loss moduli G"). In contrary, if the inks show poor printability and shape fidelity, a rectangular design is chosen to compensate for merging of the lines at the scaffold edges.

(6) After each layer is printed, the print is paused for a period of time to allow solidification induced by crosslinking and solvent evaporation. The length of the pausing time depends on the compositions of the ink and solvent evaporation rate, ranging from 1 minute to 30 minutes.

(7) Resume printing the subsequent layer.

(8) Apply adjustments to the print layer height for upper layers to compensate for the shrinkage of the struts due to solvent evaporation and crosslinking.

(9) Repeat Steps 5-8 until the desired thickness of the scaffolds is achieved.

The exact parameters for curing and print layer adjustment were determined for each ink formulation based on post-characterization including ink rheology, DSC, and standard line test. These parameters can then be used to modify the g-code developed by the printer after slicing to automate the process. The above processes may be used to 3D print thermally curable polymeric ink solutions with or without additives. These approaches may be utilized for printing, for example, biodegradable scaffolds and devices.

The above processes can also be used for any thermally curing inks, without changing any equipment on the printer or utilizing specialty formulated inks, thereby giving an advantage over prior art 3D printing techniques.

Again, it is a challenge to use extrusion based printing for thermally curing polymers and resins. The common approach is to use a photo-initiator and use light-based 3D printing technologies. In this invention, however, a novel approach is used to control the thermal curing and associated shrinkage in-situ during printing process. Namely, use of a heated printing surface or thermal treatment steps incorporated in the printing process, and the print layer adjustment.

In prior art processes, again the focus was on developing new ink formulations or additives to control the thermal curing process. The present approaches, however, do not use new ink formulations or additives to solve curing problems with the material. The present approaches are applicable to all thermally curing inks and does not require adjustment of polymer chemistry or incorporation of functional additives.

The approaches and the experimental results for the three aspects of the present disclosure will now be discussed. The first aspect is the incorporation of a heated plate. As shown in FIG. 3A, a silicone rubber heating pad or heated print surface with a thermocouple temperature sensor connected to a temperature controller was secured using Kapton tapes to ensure good contact with the substrate.

The heating pad or heated print surface was allowed to warm up and equilibrate at the set temperatures for at least 1 hour. It will be understood that alternative heating mechanisms, such as blowing heated air, could be used.

FIG. 3B shows the results for samples printed with and without using a heated substrate. A grid pattern structure was used to test the print fidelity of the parts. The first layers did not differ significantly on the non-heated and heated substrate (compare layers shown in FIG. 3B upper and lower left side views). However, when the second layer was deposited, the samples printed on the non-heated substrate led to the diffusion between adjacent intersections and merging between layers (see FIG. 3B upper right side view). On the contrary, using a heated substrate could facilitate solvent evaporation and crosslinking reaction, and hence no diffusion and layer merging were observed (see, FIG. 3B lower right side view) (compare FIG. 3B upper and lower right side views).

The second approach to improve the print quality is to set a pause time between layers. To determine the minimum pause time, $t_{pause,\ min}$, TGA was applied to study the evaporation kinetics of the inks. The sample was first equilibrated at 30° C. for 3 minutes, followed by rapidly heated to 100° C. in 2 minutes and held at 100° C. for 40 minutes, and the weight of the samples was monitored over time.

Figure 4A:
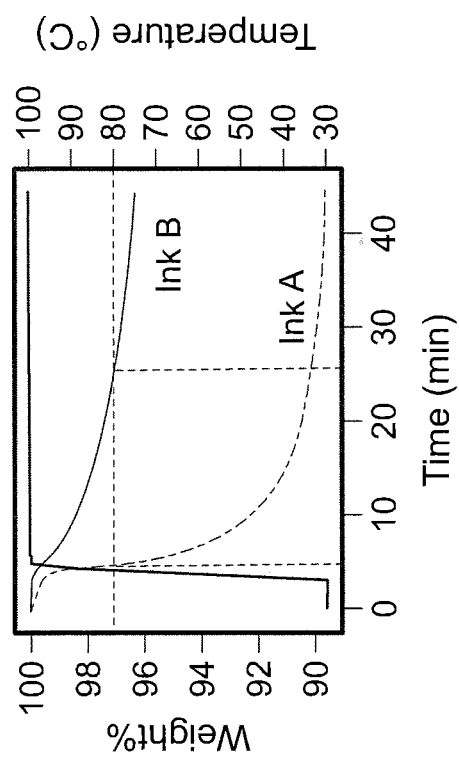
FIG. 4A is a graphical depiction showing the TGA data for determining the minimum pause time.

FIG. 4A shows the TGA result of the weight loss of two different ink compositions due to solvent evaporation. In one embodiment, the ink compositions could be biodegradable thermoset citrate-based polymeric inks made by thermal esterification of hydroxyl and carboxyl groups. It will be understood that any suitable polymeric ink could be used.

Figure 4B:
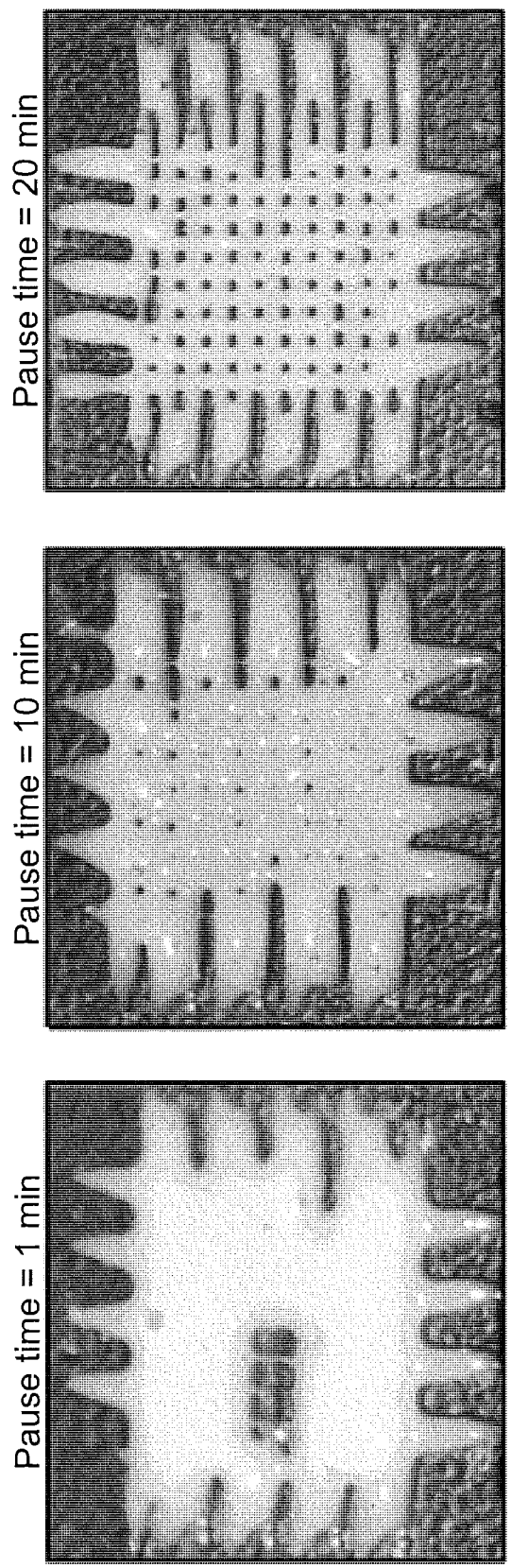
FIG. 4B shows views illustrating the effect of pause time on print resolution.

The black curve shows the temperature profile simulating the heating condition during the printing process, and the green and blue curves correspond to the results of ink A and ink B, respectively. It can be seen that the solvent in ink A evaporated much faster than that in ink B. From the figure, it can be estimated a minimum pause time, $t_{pause,\ min}$, of approximately 2 min for ink A and 25 min for ink B to reach 3% of weight loss (indicated by the red dash lines). Setting an appropriate minimum pause time can reduce layer merging and improve print resolution, as shown in FIG. 4B.

Figure 5A:
FIG. 5A are views showing the determination of the degree of strut shrinkage using the line test.

Lastly, adjusting the layer height throughout the printing process to compensate for shape shrinkage is critical to ensure continuous layer-by-layer printing. To ascertain the degree of shrinkage of the printed struts, a line test was conducted prior to printing. FIG. 5A shows the line test result.

The printed lines were immersed and broken in liquid nitrogen after the minimum pause time ($t_{pause,\ min}$) determined as the above discussion. The height $H_f$ from multiple printed lines was measured and averaged from the cross-sectional optical image (FIG. 5A left side). The $H_f$ was compared to the offset value, $H_0$ (FIG. 5A right side), to calculate the percentage of shrinkage p % by $(H_0-H_f)/H_0 \times 100\%$. In this example, the average $H_f$ is 272 μm, and $H_0$ was set to 350 μm. Therefore p %=(350-272)/350=22%. The layer height should be decreased by 22% every two layers to ensure good attachment between layers.

Figure 5B:
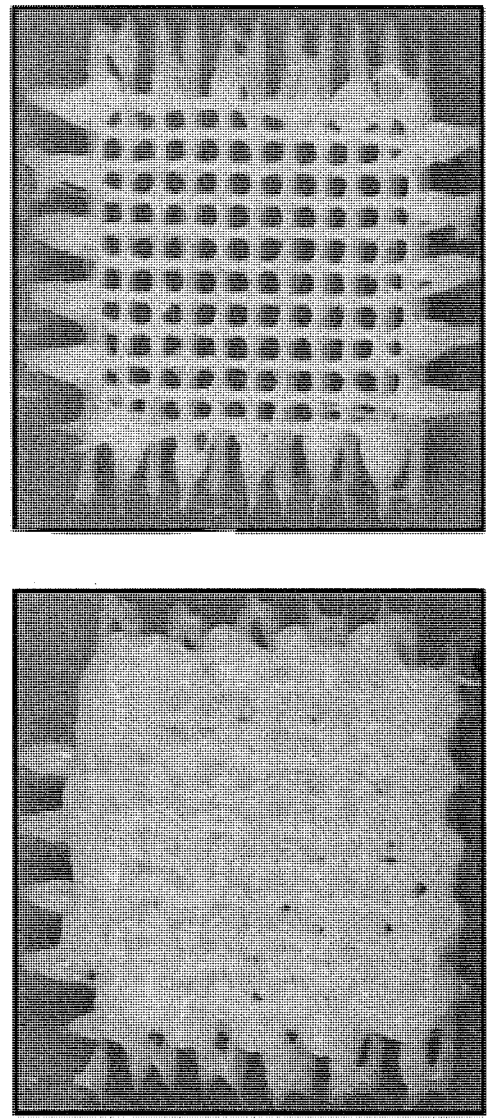
FIG. 5B are views showing the effect of layer height adjustment.

FIG. 5B shows the effect of adjusting layer height along with printing. When the sample was printed without adjusting the layer height (FIG. 5B left side), the print quickly failed at the third layer. In addition, the struts are wavy, indicating that the subsequent layers cannot adhere well to the previous layers. By continuously adjusting the layer height, the sample shows improved print quality and can be printed as tall as twelve layers with a total thickness of around 2 mm (FIG. 5B right side).

While exemplary embodiments have been described herein, it is expressly noted that these embodiments should not be construed as limiting, but that additions and modifications to what is expressly described herein also are included within the scope of the invention.

Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A method for making a 3D scaffold or a device, the method comprising the steps of:
    printing a first layer of a thermally curable polymeric ink for forming a 3D scaffold or a device on a heated support;
    printing a second layer of the 3D scaffold or the device on the first layer; and
    setting a minimum pause time $t_{pause,\ min}$ to pause between printing the first and the second layer and each subsequent layer of the 3D scaffold or the device for a curing process and subsequently forming the 3D scaffold or the device; and
    monitoring by thermogravimetric analysis (TGA) weight loss of an uncured, as-printed sample of the 3D scaffold or the device having multiple layers due to solvent evaporation during the curing process for determining the minimum pause time $t_{pause,\ min}$ between printed layers.

2. The method of claim 1, further comprising adjusting a height of at least one of the second layer or each subsequent layer of the ink by adjusting a printing nozzle of a 3D printer relative to the height of the heated support.

3. The method of claim 1, wherein the heated support is a heated print surface that is heated by blowing heated air to create a heated substrate.

4. The method of claim 1, further includes setting a temperature of the heated support to be equal or higher than a curing temperature of the ink, and approximately 5-10° C. lower than a boiling temperature of solvent used.

5. A method for making a 3D scaffold or a device, the method comprising the steps of
    printing a first layer of a thermally curable polymeric ink for forming a 3D scaffold or a device on a heated support or heated printed surface, wherein heat is provided by a heat source blowing heated air or thermal conduction to create a heated substrate;
    printing a second layer of the 3D scaffold or the device on the first layer;
    adjusting a height of at least the first layer, or the second layer; and
    monitoring by thermogravimetric analysis (TGA) weight loss of an uncured, as-printed sample of the 3D scaffold or the device having multiple layers due to solvent evaporation during a curing process for determining a minimum pause time $t_{pause,\ min}$ between printed layers.

6. The method of claim 5, further comprising the step of printing at least one subsequent layer of the 3D scaffold or the device on the second layer or the first layer.

7. The method of claim 6, further comprising the step of setting the minimum pause time $t_{pause,\ min}$ between the first layer, the second layer, or each subsequent layer of the 3D scaffold or the device.

8. The method of claim 5, wherein the heat source blowing heated air is either blowing heated air on the heated support or the heated printed surface, or on the first layer, the second layer, or at least one subsequent layer of the ink.

9. The method of claim 8, further comprising the steps of setting the minimum pause time $t_{pause,\ min}$ between each layer of the ink, and adjusting the height.

10. A method for making a 3D scaffold or a device, the method comprising the steps of:
    (1) feeding a solution ink into a direct ink writing (DIW) 3D printer;
    (2) providing a heated print surface;
    (3) adjusting a temperature control toward a desired temperature;
    (4) allowing the heated print surface to equilibrate at the desired temperature for at least 1 hour;
    (5) printing the ink on a slide, disposed on the heated print surface, as lines at a specific spacing and at a set pressure and speed to create a first layer and a second layer for forming a cross-hatched orthogonal scaffold and then a subsequent layer on top of the cross-hatched orthogonal scaffold;
    (6) after each layer is printed, pausing print for a minimum pause time $t_{pause,\ min}$ period of time to allow solidification of the layer;
    (7) resume printing a subsequent layer;
    (8) applying height adjustments to layer height for each layer;
    (9) monitoring by thermogravimetric analysis (TGA) weight loss of an uncured, as-printed sample of the 3D scaffold or the device having multiple layers due to solvent evaporation during a curing process for determining the minimum pause time $t_{pause,\ min}$ between printed layers;
and
    (10) repeating steps (5) to (9) until a desired thickness of the scaffold or the device is achieved.

11. The method of claim 10, further comprising the step of (11) further curing to achieve a fully-crosslinked and a solvent-free construct.

12. The method of claim 10, wherein the heated printed surface is heated by convention or blowing heated air, conduction, thermal radiation, evaporative cooling, or any combination thereof.

13. The method of claim 10, wherein each layer is heated by convention or blowing heated air, conduction, thermal radiation, evaporative cooling, or any combination thereof.

14. The method of claim 10, wherein the solution ink is any variety of 3D print thermally curable polymeric ink solution, with or without additives, used without changing any equipment on the printer or utilizing specialty formulated inks that are needed for flow in 3D printing.

15. The method of claim 10, wherein the solution ink is a thermoset solution ink.

16. The method of claim 10, wherein parameters of the pause time and the height adjustment for the ink is determined based on a post-characterization using an ink rheology, a differential scanning calorimetry (DSC), and a line test;
wherein the line test determines a degree of shrinkage p % and a layer height adjustment, and the line test includes:
printing a number of straight lines on the heated plate surface;
breaking the lines in half in liquid nitrogen to observe cross-sections under an optical microscope;
measuring a height $H_f$ of the lines from a cross-sectional view image; and
estimating the degree of shrinkage p % by $(H_0-H_f)/H_0 \times 100\%$, wherein an original height of the line equals the nozzle offset $H_0$ that is a distance between a tip of a printing nozzle and the heated plate surface.

17. The method of claim 16, further including the step of using the parameters of the pause time and the height adjustment to modify a G-code of the 3D printer to automate a process.

18. The method of claim 10, wherein step (3) further includes adjusting the temperature control for setting a heated print surface temperature equal or higher than a curing temperature of the ink, and approximately 5-10° C. lower than a boiling temperature of solvent used.

19. The method of claim 10, wherein step (6) further includes setting the pause time between 1 minute to 30 minutes.

20. The method of claim 10, wherein step (2) further includes placing a silicone rubber heating element with a thermocouple temperature sensor connected to a temperature controller.

21. The method of claim 10, wherein the printed object is a biodegradable scaffold, and the ink is a biodegradable polymeric ink.

* * * * *